United States Patent [19]

Schmidt et al.

[11] Patent Number: 6,005,705
[45] Date of Patent: Dec. 21, 1999

[54] ELECTROCHROMIC THIN-FILM SYSTEMS AND COMPONENTS THEREOF

[75] Inventors: Helmut Schmidt, Saarbrücken; Herbert Krug, Püttlingen; Norbert Merl, Saarbrücken; Anke Moses, Hochheim, all of Germany; Patrick Judeinstein, Gif sur Yvette, France; Anette Berni, Homburg, Germany

[73] Assignee: Institut fuer Neue Materialien Gemeinnuetzige GmbH, Saarbruecken, Germany

[21] Appl. No.: 08/722,151

[22] PCT Filed: Apr. 13, 1995

[86] PCT No.: PCT/EP95/01384

§ 371 Date: Apr. 9, 1997

§ 102(e) Date: Apr. 9, 1997

[87] PCT Pub. No.: WO95/28663

PCT Pub. Date: Oct. 26, 1995

[30] Foreign Application Priority Data

Apr. 18, 1994 [DE] Germany .............................. 44 13 403

[51] Int. Cl.$^6$ ...................................................... G02F 1/15
[52] U.S. Cl. .......................... 359/265; 359/270; 359/273; 252/519.31; 252/519.32; 429/188; 427/226; 427/126.3
[58] Field of Search ........................ 252/519.31, 519.33; 528/14, 31; 427/226, 108, 77, 58, 126.3; 359/265, 270, 272, 273, 274; 423/606; 429/188, 194

[56] References Cited

U.S. PATENT DOCUMENTS

| | | | |
|---|---|---|---|
| 4,236,792 | 12/1980 | Bissar | 359/265 |
| 5,209,871 | 5/1993 | Mason | 252/500 |
| 5,227,043 | 7/1993 | Shakushiro et al. | 252/510 |

FOREIGN PATENT DOCUMENTS

| | | |
|---|---|---|
| 61-021919 | 1/1986 | Japan . |
| 61-123690 | 6/1986 | Japan . |
| 62-036008 | 2/1987 | Japan . |
| 63-015228 | 1/1988 | Japan . |

*Primary Examiner*—Scott J. Sugarman
*Assistant Examiner*—Margaret Burke
*Attorney, Agent, or Firm*—Oblon, Spivak, McClelland, Maier & Neustadt, P.C.

[57] ABSTRACT

A description is given of electrochromic thin-film systems and their components, especially an improved electrochromic thin-film based on tungsten oxide and/or molybdenum oxide into which alkali metal ions are incorporated, an electrolyte which is improved in particular with respect to its conductivity and is based on pre-hydrolysed, organically modified alkoxysilane and on organic diol (triol), and an improved process for producing a noncolouring ion insertion layer based on cerium oxides and titanium oxides.

29 Claims, No Drawings

ELECTROCHROMIC THIN-FILM SYSTEMS AND COMPONENTS THEREOF

BACKGROUND OF THE INVENTION

1. Field of the Invention

The present invention relates to electrochromic thin-film systems and their components, especially those which are prepared by the sol-gel process.

2. Discussion of the Background

Large numbers of electrochromic thin-film systems are described in the literature for a variety of fields of application and in different combinations of individual components.

For the preparation of the functional oxide layers the methods described hitherto have predominantly been vacuum methods, such as thermal evaporation, sputtering or CVD, and also spray pyrolysis and electrochemical deposition methods. However, these processes are unsuitable and/or too cost-intensive for the production of homogeneous coatings with a large surface area. In recent years, some attempts have been made to produce such systems by sol-gel processes, since these processes are notable for a great scope variation and, owing to the avoidance of vacuum technology, by substantially lower costs for the production of homogeneous coatings of large surface area. However, the systems described in the literature to date are not yet entirely satisfactory.

In particular, in the case of electrochromic oxide layers, especially of tungsten oxides and molybdenum oxides, the fact that the oxides in a freshly prepared thin-film system are initially free from alkali metal ions means that these systems have to be operated for a relatively long period before, gradually, the desired insertion disequilibrium by incorporation of alkali metal ions from the electrolyte ion reserve. This leads to initial impairment of function.

SUMMARY OF THE INVENTION

It was therefore one object of the present invention to produce electrochromic oxide layers based on tungsten oxides and/or molybdenum oxides which are fully functional immediately after their production.

In accordance with a first aspect of the present invention it has surprisingly been found that in the case of known tungsten oxide and molybdenum oxide preparation processes some of the oxide can be converted by reaction with alkali metal salts, especially alkali metal hydroxides, into the corresponding alkali metal tungstate or, respectively, molybdate without any adverse effect on the electrochromic function or on the ability to process the layers. This considerably accelerates the establishment of a stable operating state. Given an appropriate reaction regime, the addition of the alkali metal ions also does not lead to adverse changes in the optical layer properties or in the sol properties.

Furthermore, a large number of types of electrolyte have been proposed to date for electrochromic systems. Liquid and purely organic polymer electrolytes, however, can be employed only to a limited extent owing to their limited ranges of operating temperature, while purely inorganic types are subject to similar restrictions owing to their low ion conductivity at room temperature. Polymeric electrolytes are provided by hot pressing, inorganic types usually by sputtering techniques, between the oxide electrode layers.

A second object of the present invention, accordingly, is to provide an electrolyte for electrochromic systems which even at room temperature exhibits a satisfactory ion conductivity, provides a broad range of operating temperature and can be provided in an advantageous and simple manner between the oxide electrode layers.

In accordance with a second aspect of the present invention it has surprisingly been found that novel organic-inorganic nanocomposite systems based on certain organically modified alkoxysilanes not only do not have the majority of disadvantages of the known electrolytes but also are distinguished by a level of ionic conductivity which is surprisingly high for such composites, and is sufficient even at room temperature for satisfactorily rapid electrochromic functions.

Finally, a third essential component of electrochromic thin-film systems is a noncolouring ion insertion layer. Noncolouring oxidic ion insertion layers (for protons or lithium ions) are likewise known in large numbers, based for example on oxides of cerium, titanium, vanadium, iron, zirconium, chromium and mixtures of these oxides of different composition. A known ion insertion layer is based on the oxides of cerium and titanium. Corresponding ion insertion layers have already been produced by sol-gel processes, but the disadvantage of these processes is that on the one hand they are laborious and on the other hand they lead to coating solutions with which it is not possible using only one coating operation to achieve the required layer thickness, so that multiple coating, with all the attendant disadvantages, is necessary.

A further object of the present invention, therefore, was to provide a sol-gel process for the production of noncolouring ion insertion layers based on oxides of cerium and titanium, which on the one hand can be carried out simply, rapidly and above all reproducibly and on the other hand leads to coating solutions with which it is possible to achieve the required layer thickness even with only one coating operation.

In accordance with a third aspect of the present invention it has been found that by the selection of appropriate cerium and titanium starting compounds it is possible to produce a coating solution for a noncolouring ion insertion layer based on oxides of cerium and titanium which leads, in a reproducible and rapid fashion, to coating solutions with which it is possible to realize layer thicknesses of up to about 200 nm with only one coating operation.

DETAILED DESCRIPTION OF THE PREFERRED EMBODIMENTS

In the text below, the above aspects of the present invention are described in more detail.

The first subject of the present invention is an electrochromic oxide layer which is obtainable by applying to a substrate a coating solution for an electrochromic layer which is prepared in a manner known per se and contains oxidic tungsten and/or oxidic molybdenum, and thermally aftertreating the applied layer, the coating solution and/or a precursor thereof containing, in dissolved form, an alkali metal salt in an overall quantity of from 0.001 to 1.0 mol of alkali metal per mole of tungsten and/or molybdenum.

The alkali metal is in general selected from lithium, sodium and/or potassium, lithium and sodium being preferred alkali metals and lithium being particularly preferred.

Preferred examples of alkali metal salts to be employed in accordance with the invention are the corresponding hydroxides, chlorides, nitrates and perchlorates, especially the hydroxides. Concrete examples of such alkali metal salts are $LiOH$, $NaOH$, $KOH$, $LiCl$, $LiNO_3$, $LiClO_4$ and $NaCl_4$, $LiOH$ being a particularly preferred alkali metal salt.

The addition of the alkali metal salt can be made at any moment before, during or after the preparation of the tungsten oxide and/or molybdenum oxide, although it is preferably added at the end, i.e. to the solution which per se is ready for coating.

The quantity of alkali metal salt employed is in general in the range from 0.001 to 1.0 mol, preferably from 0.01 to 0.75 mol, of alkali metal per mole of tungsten and/or molybdenum. Particular preference is given to a range from 0.02 to 0.6 and, in particular, from 0.05 to 0.3 mol of alkali metal per mole of W and/or Mo.

The solvent for the above coating solution is generally, at least predominantly, an alcohol which is liquid at room temperature, preferably an alcohol having 1 to 4 carbon atoms. Concrete examples thereof are methanol, ethanol, propanol and isopropanol.

The concentration of tungsten and/or molybdenum in the coating solution is in general from 1 to 50 percent by weight, preferably from 2 to 40 percent by weight, based on $MO_3$ (M=W and/or Mo). With particular preference there are from 5 to 30 percent by weight, and in particular from 10 to 20 percent by weight, of $MO_3$ in the coating solution.

In order to prepare coating solutions for electrochromic layers containing oxidic tungsten and/or oxidic molybdenum the prior art describes a number of processes of which, in accordance with the invention, preference is given to those which start from the metal oxohalide or from metal+ $H_2O_2$. These processes will be illustrated in more detail below in relation to the production of coating solutions containing tungsten oxide.

In the process starting from metal oxohalides, for example, solutions of tungsten oxochloroalkoxides are synthesized by reacting tungsten oxide tetrachloride, $WOCl_{41}$ with dried short-chain alcohols (in particular methanol, ethanol, 1- and 2-propanol) in concentrations of from 0.05 to 0.6 mol per liter under nitrogen and/or dried air. Normally, the solid $WOCl_4$ is introduced as initial charge and the alcohol is added in portions, during which gaseous HCl is evolved. The solution is then stirred at room temperature for about 15 minutes, subsequently heated at reflux for about 15 to 90 minutes under a stream of nitrogen, and then cooled to room temperature. In order to prolong its shelf life, it can be stored at temperatures ranging to $-20°$ C.

In accordance with the present invention it is particularly preferred to add the alkali metal salts, in the concentrations indicated above, to these otherwise finished coating solutions.

In the case of the preparation of coating solutions via the metal+$H_2O_2$ route, for example, solutions of peroxotungstic acid are prepared by reacting tungsten metal with aqueous hydrogen peroxide (usually in a concentration of from 10 to 30 percent by weight of $H_2O_2$), the metal usually being introduced as initial charge and the peroxide solution being added in portions, and complete reaction being awaited after each addition. The reaction temperature is usually set by means of a thermostat bath at from 0 to 80° C., preferably from 40 to 60° C. Following the reaction the desired quantity of a short-chain alcohol (e.g. methanol, ethanol, 1- or 2-propanol or mixtures thereof) is added, the clear solution is stirred at from 20° C. to 50° C. for from 1 to 24 hours, preferably from 4 to 8 hours, the solution is subsequently concentrated almost to dryness under reduced pressure (e.g. from 50 to 300 mbar) while heating at from 30 to 70° C., preferably from 45 to 55° C., and is then cooled to room temperature. By dissolution in the pure alcohols (see above) it is possible to obtain a solution with a defined content of peroxo acid (preferably from 10 to 50 percent by weight, in particular from 15 to 25 per cent by weight, calculated as $WO_3$), which is ready for coating. According to the present invention, this otherwise finished coating solution is preferably added to the alkali metal salt in the quantities indicated above. This solution too can be stored at temperatures up to $-20°$ C. in order to prolong its shelf life.

The coating solutions prepared as above can be applied to prepared substrates by, for example, immersion, spraying or spin-coating techniques. This application is preferably carried out at a temperature of from 15 to 25° C. and a relative atmospheric humidity of from 5 to 50° C. A particularly preferred temperature range is from 18 to 22° C. and in particular from 19 to 21° C. Preferred relative atmospheric humidities are from 10 to 30% and, in particular, from 15 to 25% in the case of the tungsten oxochloride route and from 5 to 30%, especially from 5 to 15%, in the case of the peroxo acid route.

The substrates coated as just described are then thermally aftertreated in order to produce the finished electrochromic layers In general, a thermal aftertreatment of this kind comprises heating at a temperature of from 80 to 400° C. for from 10 minutes to 48 hours. A preferred temperature range is from 100 to 250° C. and, in particular, from 140 to 200° C., while preferred treatment times are from 15 minutes to 24 hours and, in particular, from 30 minutes to 12 hours.

In this way it is possible in one coating step to produce layers of up to 500 nm in thickness with little cracking. It is also possible, however, to deposit a number of layers (for example up to 5) over one another, in which case a thermal aftertreatment (densification) is preferably carried out after each coating step. It is thus possible by means of different thermal treatment of a plurality of layers to produce gradient systems over one another. By using different coating solutions for the multiple coating, however, it is also possible to establish gradients of the lithium content, for example.

In order to improve adhesion the first coating on a substrate can be produced with a relatively dilute solution (e.g. from 0.05 to 0.15 mol/liter, in particular about 0.1 mol/liter of metal oxide) and to subject it to thermal aftertreatment at, for example, from 180 to 230° C., in particular from 200 to 210° C., for from 15 to 45 minutes, in particular from 25 to 35 minutes.

In the case of the (particularly preferred) immersion coating, coating of the reverse of the substrate can be avoided by masking off the reverse with, for example, a self-adhesive tape. This masking is preferably removed prior to the thermal aftertreatment.

As substrate (support) for the thin electrochromic layer produced as above, suitable substrates are in principle all those which are transparent, can be provided with a transparent conductive layer and withstand the temperatures which are to be employed in the course of thermal aftertreatment of the applied layer. These substrates are preferably of glass or transparent plastic, for example corresponding plates with a thickness of in general from 0.5 to 6.0 mm, preferably from 0.9 to 2.0 mm. These plates (preferably glass) are either completely planar or only slightly curved.

The conductive layer provided on the transparent substrate may be a customary transparent conductive layer, for example one of indium-tin oxide (ITO), fluorine-doped tin oxide and antimony-doped tin oxide, and of doped zinc oxide and doped titanium oxide. In certain cases, however, it is also possible to use thin metal layers (for example of silver with a thickness of <20 nm) as transparent electron-conducting layers.

If a glass substrate is used as layer support, then it is possible to provide a diffusion barrier layer, for example of SiO, between the glass substrate and the electron-conducting layer in order to avoid the diffusion of alkali metal from the glass. The resistance of the electron-conducting layer should be as small as possible, preferably—depending on the field of application and/or substrate size—below 100 Ω/□, in particular below After cutting them to the desired size, the substrates are usually subjected to a defined washing and cleaning procedure using organic solvents, surfactant solutions and ultrapure water in an ultrasonic bath.

A second subject of the present invention is an electrolyte for electrochromic thin-film systems which is obtainable by
(a) partial hydrolysis and condensation of at least one silane of the general formula $$R_nSiX_{4-n} \qquad (I)$$

in which the radicals R, which are identical to or different from one another, are nonhydrolysable groups of which at least one comprises a thermally or photochemically polymerizable (or polycondensable) group, the radicals X, which are identical or different from one another, are OH or hydrolysable groups, and n is 1 or 2;
(b) reaction of the partially hydrolysed (condensed) silane from stage (a) with a diol and/or triol (preferably diol) which is liquid at room temperature, optionally (and preferably) in the presence of an initiator;
(c) establishment of a pH in the range from 4.0 to 8.0 using acid;
(d) addition, at any moment after stage (a) and before stage (c), of at least one alkali metal salt which is soluble in the system; and
(e) thermal or irradiation treatment of the resulting system, at least one silane of the general formula $$R'_mSiX_{4-m} \qquad (II)$$

in which R' is alkyl, alkaryl, aralkyl or aryl (preferably having up to 20 and in particular up to 12 carbon atoms), the radicals X are identical to or different from one another and are OH or hydrolyzable groups, and m is 0 or 1, additionally being added to the system at any moment after stage (a) and before stage (c).

In the above stage (a), in general from 10 to 90%, preferably from 20 to 80% and, in particular, from 30 to 70% of all hydrolyzable groups present are eliminated by hydrolysis.

Examples of groups X in the formulae (I) and (II) are those of the formula OR" and OCOR" in which R" is alkyl having 1 to 8, especially 1 to 4 carbon atoms, and also halogen, especially chlorine.

The groups X are preferably identical and selected from $OCH_3$, $OC_2H_5$ and $OC_3H_7$, particular preference being given to $OCH_3$ and $OC_2H_5$.

The groups R in the formula (I) are preferably those having (at least) one ethylenically unsaturated bond and/or (at least) one epoxide ring. Concrete examples thereof are (meth)acryloyloxy-$C_{2-6}$-alkyl and glycidoxy-$C_{2-6}$-alkyl, a preferred example of the $C_{2-6}$-alkyl group being propyl.

It is additionally preferred for n in formula (I) to be 1. Consequently, taking into account the preferred embodiments just given (especially taking into account their ease of availability), particularly preferred specific compounds of the general formula (I) are glycidoxypropyltri(m)ethoxysilane and methacryloyloxypropyltri(m)ethoxysilane.

The diol and/or triol which is liquid at room temperature and is to be employed in the above stage (b) is preferably a poly-$C_{2-6}$-alkylene glycol, especially a polyethylene or polypropylene glycol. Specific examples thereof are, for example, diethylene glycol, triethylene glycol, tetraethylene glycol and dipropylene glycol.

Other preferred diols and/or triols which can be employed in stage (b) are alkylene oxide adducts of a customary diol and/or triol (for example of ethanediol, propanediol, butanediol, hexanediol, glycerol and trimethylolpropane) with ethylene oxide and/or propylene oxide, in which case it is possible, for example, for from 1 to 20 mol, preferably from 1 to 10 mol, of ethylene oxide and/or propylene oxide to be added onto the diol or triol.

In the case of the use of a silane of the general formula (I) comprising an epoxide ring, the initiator compound preferably employed serves to catalyse the polymerization of the epoxide groups and the partial linking thereof with the diols and/or triols. For this purpose the initiator is preferably selected from organic amines, for example 1-methylimidazole, N-3-(triethoxy)-propyl-4,5-dihydroxyimidazole, 4,41-diaminodiphenylmethane, benzyldimethylamine and diazabicycloundecane, amino-containing silanes, for example N-(2-amino-3-aminopropyl) trimethoxysilane and 3-aminopropyltrimethoxysilane, organoaluminium compounds, for example aluminium sec-butylate and aluminium butoxyethanolate, if desired after complexing with a chelate ligand, and aluminium salts of organic and inorganic acids, for example acetic acid, propionic acid, perchloric acid, hydrochloric acid, sulphuric acid, phosphoric acid, etc., if desired after complexing beforehand with a chelate ligand. It is of course also possible to employ other initiators, for example boron trifluoride-ethylamine complex.

The silane of the general formula (II) which is to be employed in accordance with the invention and which surprisingly brings about a marked increase in the conductivity of the electrolyte and accelerates the curing is preferably one in which m is 0 or R' is $C_{1-4}$-alkyl (e.g. methyl or ethyl). Particularly preferred concrete examples of silanes of the general formula (II) are tetramethoxysilane and tetraethoxysilane.

The alkali metal salt to be added in accordance with stage (d) can in principle be any alkali metal salt which dissolves in the coating system. In general it is a salt of lithium, sodium and/or potassium, especially lithium or sodium, with particular preference being given to lithium salts. Owing to the solubility property, the counterion is in general the perchlorate anion, although it is also possible to use other salts such as, for example, hydroxides. Concrete examples of alkali metal salts which can be employed in stage (d) are $LiClO_4$, $NaClO_4$ and LiOH.

The alkali metal salt is preferably added at the same time as or after the diol (triol) employed in stage (b).

Although the proportions of the components employed may vary widely, the molar quantities of the individual components per mole of silane of the general formula (I) which are employed are generally as follows:
(i) from 0.01 to 3.0 mol, preferably from 0.25 to 2.25 mol and in particular from 1.0 to 1.75 mol of diol and/or triol;
(ii) from 0.01 to 2.0 mol, preferably from 0.025 to 1.0 mol and in particular from 0.05 to 0.75 mol of alkali metal salt;
(iii) from 0.01 to 1.0 mol, preferably from 0.025 to 0.5 mol and in particular from 0.05 to 0.25 mol of initiator;
(iv) from 0.01 to 0.3 mol, preferably from 0.025 to 0.2 mol and in particular from 0.05 to 0.15 mol of silane of the formula (II).

The acid which is added in the above stage (c) in order to establish a pH in the range from 4.0 to 8.0 can be an inorganic or organic acid, for example hydrochloric acid, acetic acid or adipic acid, which is generally employed in quantities of from 0.01 to 1.5 mol per mole of silane of the formula (I). Preferred quantities added are from 0.05 to 1.0 mol and in particular from 0.1 to 0.5 mol of acid per mole of silane of the formula (I), preferred pH ranges being from 5 to 7.5 and, in particular, from 6 to 7.

The establishment of the pH in step (c) is preferably carried out directly before using the system in order to prepare the electrolyte in the thin-film cell by thermal treatment. This thermal treatment is preferably carried out at temperatures from 50 to 150° C. for from 10 minutes to 48 hours. Preferred treatment temperatures are in the range from 60 to 120° C. and in particular from 75 tb 100° C., treatment times of from 15 minutes to 24 hours and, in particular, from 30 minutes to 12 hours being especially preferred.

In general, an electrolyte prepared as described above has nanoscale particles with radii of up to 50 nm, in particular up to 20 nm.

The viscosity of the electrolyte mixtures prior to the thermal treatment depends on the composition and the standing time and is customarily in the range from 0.2 to 1.4 Pa.s, and in some cases a tendency towards pseudoplasticity has been noted.

The shrinkage rate in the course of the thermal treatment (curing) of the material prepared in accordance with the above process is usually in the range between 4 and 12% (expressed as volume decrease) and can be controlled via the composition of the material.

The material which supplies the finished electrolyte in the course of the thermal (or irradiation) treatment can, for example, be incorporated between the electrochromic layer and the ion insertion layer by applying it to one or both of the layers, for example by dropping, spreading, knife coating, spraying or screen printing.

A third subject of the present invention is a process for the preparation of a coating solution based on cerium oxides and titanium oxides for use in the production of oxidic noncolouring ion insertion layers for electrochromic thin-film systems, in which a titanium tetraalkoxide is added to a solution of a cerium(III) salt in an alcohol which is liquid at room temperature (preferably an alcohol having 1 to 4 carbon atoms such as, for example, methanol, ethanol, propanol and isopropanol) in a quantity such that the atomic ratio of Ce to Ti is in the range from 0.9:1 to 1:0.9 (preferably from 0.95:1 to 1:0.95 and, in particular, from 0.99:1 to 1:0.99), and the resulting solution is heated in the presence of water at temperatures from 40° C. to the boiling point of the solvent for from 10 minutes to 24 hours (preferably for from 20 minutes to 2 hours and in particular from 30 minutes to 90 minutes).

As cerium(III) salt in the above process it is possible to employ any desired cerium(III) salt which dissolves in the alcohol which is liquid at room temperature. Examples hereof are the nitrate and chloride, for example, the nitrate being particularly preferred.

The titanium tetraalkoxide which must be employed in the above process is preferably one of the general formula $Ti(OR)_4$, in which R is $C_{1-4}$-alkyl. Concrete and preferably employed titanates are $Ti(OCH_3)_4$, $Ti(OC_2H_5)_4$ and Ti(n- or i-$C_3H_7)_4$.

In accordance with the invention it is also preferred to employ a cerium(III) salt which contains water of crystallization (for example cerium nitrate hexahydrate), so that at least some of the water (preferably all of the water) which is employed in the process is provided by this water of crystallization.

The quantity of water employed in the above process is generally from 0.5 to 10 mol, preferably from 1 to 8 mol and, in particular, from 2 to 6 mol, per mole of titanium tetraalkoxide. The cerium compounds and titanium compounds are generally present in each case in a concentration of from 0.01 to 0.5 mol per liter, preferred concentrations being from 0.025 to 0.4 mol and, in particular, from 0.05 to 0.3 mol per liter.

When carrying out the above process it is possible, for example, to follow a procedure in which sols are produced by dissolving cerium(III) salt (e.g. cerium(III) nitrate hexahydrate) in the short-chain alcohol (e.g. methanol, ethanol, 1- or 2-propanol or mixtures thereof) in concentrations of from 0.05 to 0.5 mol per liter, preferably from 0.2 to 0.3 mol per liter, adding a titanium tetraalkoxide (e.g. titanium tetraisopropoxide) in portions and in concentrations of from 0.05 to 0.5 mol per liter, preferably from 0.2 to 0.3 mol per liter, and heating the clear solution under reflux for a defined period (e.g. from 10 to 120 minutes, in particular from 30 to 90 minutes). In this procedure, a chemically controlled prehydrolysis takes place with the formation of nanoscale particles (size <100 nm) and an increase in viscosity. These sols, especially when stored at temperatures of around −20° C., can be kept for several weeks.

From these sols it is possible to produce oxidic coatings by applying these sols to appropriate substrates, for example by dipping, spraying or spin coating (preferably dipping). Suitable substrates are the same as those described above in connection with the electrochromic thin-films. Coating is suitably carried out under defined conditions of temperature and relative atmospheric humidity. Coating is generally carried out at temperatures of from 15 to 25° C., preferably from 18 to 22° C. and, in particular, from 19 to 21° C. at relative atmospheric humidities of from 5 to 50%, preferably from 10 to 40% and, in particular, from 20 to 30%.

If dip coating is carried out, it is generally effected with a drawing rate of from 2 to 6 mm per second, preferably from 3 to 5 mm per second. In this way it is possible to produce layer thicknesses of up to about 200 nm in only one single coating step with little cracking.

Following the coating operation, the applied layer is thermally aftertreated (densified) using, in general, temperatures from 200 to 600° C. and treatment times from 5 to 120 minutes. Preferred temperature ranges are from 250 to 500° C. and, in particular, from 300 to 400° C., and preferred treatment periods are in the range from 10 to 90 minutes and, in particular, from 15 to 60 minutes.

It is possible to deposit a plurality (e.g. 3) of layers over one another, in which case a thermal aftertreatment should be carried out after each coating operation.

In order to avoid double-sided coating in the course of dip coating it is possible to mask off the reverse of the substrate (for example with a self-adhesive tape). This masking is preferably removed again prior to the thermal treatment.

The present invention also relates to electrochromic thin-film systems comprising one or more of the components described above. Thin-film systems of this kind can be produced from the above components by, for example, applying the electrolyte (for example by knife coating) to one (or both) of the two oxide-coated substrates (preferably to the $CeTiO_2$ layer) and then pressing on the second oxide-coated substrate so as to give a bubble-free system. In this case, an overlap of the subsystems must be provided for the purpose of subsequent contacting. After the fixing operation, and depending on the initiator in the electrolyte employed, the electrolyte layer is cured by polymerization or crosslinking either thermally, via a temperature programme, or by irradiation with visible light and subsequent thermal aftercuring. In this case the electrolyte layer acts virtually as an adhesive which binds the two layers to one another.

Sealing prevents the emergence of organic by-products and the ingress of moisture. For this purpose the interspace and/or the edge of the thin-film cell can be sealed with materials such as two-pack epoxy adhesives, silicone adhesives, butyl rubbers, hot-melt adhesives and other sealing materials, the position of the two substrates also being fixed permanently. The uncoated edge regions of both substrates are preferably coated with conductivity adhesives or conductivity coatings, containing carbon or metal, and for the purpose of contacting are connected, for example, to metal wires.

Regarding the substrates it should also be mentioned that, for example under one of the oxide coatings or on the reverse side of one of the substrates, it is possible to apply a reflecting (metal) layer (for example of Pt, Pd, Ag, Al) which may simultaneously serve as electron conductor and as reflector in a reflecting component.

Up to now, integrally mediated transmission changes of 70% to 20% have been achieved in thin-film systems (in the VIS range from 380 to 800 nm), with transient times (90%→10% or 10%→90% of the end values) of below 1 minute.

The examples which follow are intended to illustrate the present invention in more detail, but without restricting the scope of this invention.

EXAMPLE 1

(a) Preparation of the electrochromic thin-film

Two tungsten oxide layers were produced by twice dip coating a prepared substrate (precleaned ITO-coated glass substrate with a thickness of 1 mm and a resistance of 20 $\Omega/\square$) with, respectively, a 0.1 or 0.5 molar tungsten oxochloroisopropylate solution. The corresponding solutions were synthesized by reacting tungsten oxide tetrachloride ($WOCl_4$) with absolute 2-propanol in concentrations of 0.1 or, respectively, 0.5 mol/liter under nitrogen (0.1 M: 2.39 g of $WOCl_4$ in 70 ml of alcohol; 0.5 M: 11.95 g of $WOCl_4$ in 70 ml of alcohol). The solid $WOCl_4$ was introduced as initial charge and the alcohol was added in portions at room temperature, with HCl gas being evolved. The solutions were subsequently stirred at room temperature for 15 minutes, then heated at reflux under nitrogen for 90 minutes and subsequently cooled to room temperature. Lithium hydroxide was then added to these solutions in a quantity so as to give a concentration of 0.15 mol of Li per mole of W.

The subsequent coating operation was carried out in an atmospherically controlled chamber at 10% relative atmospheric humidity and 20° C. The first coating was carried out with a 0.1 molar solution, after which the coated substrate was thermally densified at 200° C. for 30 minutes. The second coat was applied analogously using a 0.5 molar solution, densification being carried out for 4 hours at 150° C.

(b) Preparation of the noncolouring ion insertion layer 7.60 g (17.5 nmol) of cerium(III) nitrate hexahydrate were dissolved in 70 ml (55.3 g) of ethanol which had been dried over molecular sieve (0.3 nm). The solution was clear and colourless. 7.11 g (17.5 mmol) of titanium tetraisopropylate were added portionwise with stirring at room temperature under exclusion of moisture, producing a clear yellow solution which was then heated at reflux for 60 minutes, in the course of which a visually detectable clouding occurred. After cooling to room temperature, a precleaned ITO-coated glass substrate (thickness 1.0 mm, resistance 20 $\Omega/\square$) was dipped into the solution and drawn out mechanically at a rate of 4 mm per second, a region on the ITO-coated side remaining uncoated as a result of masking. Dip coating was carried out in a closed chamber in which a temperature of 20±1° C. and a relative atmospheric humidity of 30±1% had been established. After a waiting time of 15 minutes, the coated substrates were densified in an oven at 430° C. for 20 minutes and then cooled at a rate of about 20° C. per minute.

(c) Preparation of the electrolyte

In order to synthesize the electrolyte, 1 mol of glycidoxypropyltrimethoxysilane was mixed with 1.5 mol of 0.1 molar HCl solution and the mixture was stirred at room temperature for 24 hours after which the methanol formed was removed by distillation under reduced pressure.

1 mol of prehydrolysed glycidoxypropyltrimethoxysilane was then mixed with 1.5 mol of tetraethylene glycol and then, with stirring at room temperature, 0.65 mol of lithium perchlorate was added to the resulting solution. After complete dissolution of the lithium salt (about 15 minutes), 0.08 mol of 3-aminopropyltrimethoxysilane as initiator was added at room temperature. This was followed by the addition of 0.1 mol of tetraethoxysilane at room temperature. The initially cloudy solution clarified after 5 minutes and was subsequently stirred at room temperature for 30 minutes more. Prior to the assembly of the cell, the electrolyte was provided with concentrated hydrochloric acid in a quantity of 1 mol of HCl (per mole of prehydrolysed silane) and thorough stirring was carried out.

(d) Preparation of the electrochromic thin-film system

The tungsten oxide layer prepared above under (a) was covered dropwise with the electrolyte prepared in accordance with (c), and the cerium/titanium oxide layer prepared in accordance with (b) was pressed with a slight offset against the tungsten oxide layer, so that uncoated ITO areas projected, and was fixed. For curing, the layers were treated at 85° C. for 24 hours. The edges of the cell were subsequently sealed with epoxy adhesive, which was cured at 65° C. for 20 hours. The projecting uncoated ITO areas were contacted with silver conductive lacquer and stranded copper wire.

EXAMPLE 2

The electrochromic tungsten oxide layer was prepared from an ethanolic peroxotungstic acid solution which had been prepared by reacting tungsten metal with hydrogen peroxide (30% strength aqueous solution), introducing the peroxide solution as initial charge and adding the metal in portions. The reaction temperature was maintained at 60° C. by a thermostat bath. After the reaction, 8 ml of ethanol per g of tungsten were added, the clear solution was stirred at 20° C, for 2 hours and then concentrated almost to dryness under reduced pressure (50 to 300 mbar) with heating at 50° C., and the concentrated solution was then cooled to room temperature. Dissolution in ethanol with 10 percent by weight of water gave a solution containing 18 percent by weight of peroxo acid which, after addition of lithium hydroxide in a concentration of 0.15 mol of lithium per mole of tungsten, was used directly for coating in an atmospherically controlled chamber. Dip coating of the substrate took place at 10% relative atmospheric humidity and 20° C. The coated substrate was thermally aftertreated at 160° C for 45 minutes.

The procedure was otherwise as described in Example 1 under (b) to (d).

We claim:

1. A method of preparing an electrochromic oxide layer, which comprises applying to a substrate a coating solution for the electrochromic layer which is prepared by reacting hydrogen peroxide with tungsten or molybdenum or both, wherein, in said coating solution or a precursor thereof or both, an alkali metal hydroxide is dissolved in an overall quantity of from about 0.001 to 1.0 mol of alkali metal per mole of tungsten or molybdenum or both and thermally after-treating the applied layer to form an electrochromic oxide.

2. The method of claim 1, wherein the alkali metal is Li, Na, K or a combination thereof.

3. The method of claim 1, wherein the alkali metal hydroxide is lithium hydroxide.

4. The method of claim 1, wherein the alkali metal hydroxide is employed in an overall quantity of from about 0.01 to 0.5 mol of alkali metal per mole of tungsten or molybdenum or both.

5. The method of claim 1, wherein said coating solution has an alcohol solvent which is liquid at room temperature.

6. The method of claim 1, wherein a concentration of tungsten or molybdenum or both in the coating solution is from about 1 to 50 percent by weight, based on $MO_3$, wherein M is tungsten or molybdenum or both.

7. The method of claim 1, wherein the coating solution is applied at a temperature of from about 15 to 25° C. and at a relative atmospheric humidity of from about 5 to 50%.

8. The method of claim 1, wherein the thermal after-treatment is effected at a temperature from about 80 to 400° C. for from 10 minutes to 2 days.

9. The method of claim 2, wherein the alkali metal is Li, Na or a combination thereof.

10. The method of claim 5, wherein the alcohol has 14 carbon atoms.

11. The method of claim 7, wherein the coating solution is applied by dipping, spraying or spin coating.

12. An electrolyte obtained by
(a) partial hydrolysis and condensation of at least one silane of the general formula $$R_nSiX_{4-n} \quad (I)$$

in which radicals R, which are identical to or different from one another, are nonhydrolysable groups of which at least one comprises a thermally or photochemically polymerizable or polycondensable group, the radicals X, which are identical or different from one another, are OH or hydrolyzable groups, and n is 1 or 2;
(b) reaction of the partially hydrolysed and condensed silane from stage (a) with a diol and/or triol which is liquid at room temperature, optionally in the presence of an initiator;
(c) establishing a pH in the range from 4.0 to 8.0 using acid;
(d) adding, at any moment after stage (a) and before stage (c), at least one alkali metal salt which is soluble in the system; and
(e) thermal or irradiation treatment of the resulting system;
wherein at least one silane of the general formula $$R'_mSiX_{4-m} \quad (II)$$

in which R' is alkyl, alkaryl, aralkyl or aryl, radicals X are identical to or different from one another and are OH or hydrolyzable groups, and m is 0 or 1, is additionally added to the system at any moment after stage (a) and before (c).

13. The electrolyte according to claim 12, wherein in stage (a) from 10 to 90% of all hydrolyzable groups present are eliminated by hydrolysis.

14. The electrolyte according to claim 12, wherein groups X in formulae (I) and (II) are of the formula OR" in which R" is alkyl having 1 to 8 carbon atoms.

15. The electrolyte according to claim 12, wherein at least one of the groups R in formula (I) has an ethylenically unsaturated bond and/or an epoxide ring.

16. The electrolyte according to claim 12, wherein n in formula (I) is 1.

17. The electrolyte according to claim 12, wherein the diol and/or triol which is liquid at room temperature is an alkylene oxide adduct of a diol and/or triol.

18. The electrolyte according to claim 12, wherein the diol which is liquid at room temperature is a poly-$C_{2-6}$-alkylene glycol.

19. The electrolyte according to claim 12, wherein the initiator is selected from the group consisting of organic amines, amino-containing silanes, organoaluminium compounds and aluminum salts which are derived from organic and inorganic acids.

20. The electrolyte according to claim 12, wherein m in the formula (II) is 0 or R'0 is $C_{1-4}$-alkyl.

21. The electrolyte according to claim 12, wherein the alkali metal salt is a salt of Li, Na or K.

22. The electrolyte according to claim 12, wherein:
(i) from 0.01 to 3.0 mol of diol and/or triol;
(ii) from 0.01 to 2.0 mol of alkali metal salt;
(iii) from 0.01 to 1.0 mol of initiator;
(iv) from 0.01 to 0.3 mol of silane of the formula (II) are employed per mole of silane of the general formula (I).

23. The electrolyte according to claim 12, wherein the acid in stage (c) is employed in a quantity of from 0.01 to 1.5 mol per mole of silane of the formula (I).

24. The electrolyte according to claim 12, wherein the thermal treatment is carried out at from 50 to 150° C. for from 10 minutes to 48 hours.

25. The electrolyte of claim 14, wherein R" is alkyl having 1–4 carbon atoms.

26. The electrolyte of claim 18, wherein the poly-$C_{2-6}$-alkylene glycol is a polyethylene glycol, a polypropylene glycol or a mixture thereof.

27. The electrolyte of claim 21, wherein the alkali metal salt is a perchlorate.

28. An electrolyte precursor obtained by the process of claim 12 without step (e) and with or without step (c).

29. An electrochromic thin-film system, comprising:
(a) an electrochromic oxide layer,
(b) a noncoloring ion insertion layer, and
(c) an electrolyte located between these layers, wherein component (c) is the electrolyte according to claim 12.

* * * * *